(12) United States Patent
Tsukamoto et al.

(10) Patent No.: US 11,379,030 B2
(45) Date of Patent: Jul. 5, 2022

(54) CONTROLLING POWER EFFICIENCY OF AN INFORMATION PROCESSING DEVICE

(71) Applicant: LENOVO (Singapore) PTE. LTD., New Tech Park (SG)

(72) Inventors: Hideshi Tsukamoto, Yokohama (JP); Kazuhiro Kosugi, Yokohama (JP); Yuichiro Seto, Yokohama (JP); Akinori Uchino, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 64 days.

(21) Appl. No.: 16/815,795

(22) Filed: Mar. 11, 2020

(65) Prior Publication Data

US 2020/0233479 A1    Jul. 23, 2020

Related U.S. Application Data

(63) Continuation-in-part of application No. 16/400,428, filed on May 1, 2019, now abandoned.

(30) Foreign Application Priority Data

May 1, 2018   (JP) .............................. JP2018-88261

(51) Int. Cl.
*G06F 1/3203*     (2019.01)
*G06F 1/3212*     (2019.01)
(Continued)

(52) U.S. Cl.
CPC .......... *G06F 1/3212* (2013.01); *G06F 1/3296* (2013.01); *H02J 7/00032* (2020.01); *H02J 7/007192* (2020.01); *H02J 2207/20* (2020.01)

(58) Field of Classification Search
CPC ...................................... G06F 1/3203
(Continued)

(56) References Cited

U.S. PATENT DOCUMENTS

2008/0320322 A1   12/2008 Green et al.
2009/0278506 A1*  11/2009 Winger ................ H02J 7/0068
                                                 320/160

(Continued)

FOREIGN PATENT DOCUMENTS

CN    107968446 A  *  4/2018
JP    H10341536 A     12/1998
(Continued)

OTHER PUBLICATIONS

U.S. Appl. No. 16/400,428, "Office Action Summary", dated Nov. 16, 2020, pp. 1-26.

*Primary Examiner* — Suresh Suryawanshi
(74) *Attorney, Agent, or Firm* — Kunzler Bean & Adamson

(57) ABSTRACT

An apparatus for controlling power efficiency of an information processing device is disclosed. The apparatus includes a voltage converter that converts an input voltage into a predetermined output voltage, an information processing device that consumes power supplied by the voltage converter, a battery pack that is charged using power supplied at a predetermined charging voltage by the voltage converter, and a controller that determines the input voltage where the power supplied by the voltage converter exceeds power consumed by the information processing device and a difference between the input voltage and the predetermined charging voltage is minimized. A method and a system also perform various functions of the apparatus.

20 Claims, 6 Drawing Sheets

(51) Int. Cl.
  *G06F 1/3296* (2019.01)
  *H02J 7/00* (2006.01)
(58) Field of Classification Search
  USPC .......................................................... 713/323
  See application file for complete search history.

(56) References Cited

U.S. PATENT DOCUMENTS

| | | |
|---|---|---|
| 2010/0091531 A1 | 4/2010 | Lum |
| 2010/0185877 A1 | 7/2010 | Chueh et al. |
| 2010/0301937 A1 | 12/2010 | Murayama |
| 2010/0315249 A1 | 12/2010 | Imai |
| 2012/0281447 A1 | 11/2012 | Heo et al. |
| 2013/0343105 A1 | 12/2013 | Kosugi |
| 2014/0062435 A1* | 3/2014 | Lu .......................... H02J 7/0072 323/282 |
| 2015/0067362 A1* | 3/2015 | Sultenfuss .............. G06F 1/263 713/320 |
| 2015/0100107 A1 | 4/2015 | Kiani et al. |
| 2015/0155781 A1 | 6/2015 | Serdarevic |
| 2015/0349630 A1 | 12/2015 | Peng et al. |
| 2016/0352232 A1 | 12/2016 | Chang |
| 2017/0085098 A1 | 3/2017 | Sporck et al. |
| 2018/0013303 A1* | 1/2018 | Wu .......................... H02J 7/02 |
| 2018/0054080 A1* | 2/2018 | Lampinen ................ G06F 1/26 |

FOREIGN PATENT DOCUMENTS

| | | |
|---|---|---|
| JP | 2001228942 A | 8/2001 |
| JP | 2005331583 A | 12/2005 |
| JP | 2010286994 A | 12/2010 |
| JP | 2011034163 A | 2/2011 |
| JP | 2011150610 A | 8/2011 |
| JP | 2011227753 A | 11/2011 |
| JP | 2016067104 A | 4/2016 |
| JP | 2016095860 A | 5/2016 |
| JP | 2017068499 A | 4/2017 |
| JP | 2019016252 A | 1/2019 |
| JP | 2019046391 A | 3/2019 |
| WO | WO-2016159248 A1 * | 10/2016 ............... H04B 1/59 |

* cited by examiner

| TEMPER-ATURE | SET TEMPERATURE (°C) | | | | | |
|---|---|---|---|---|---|---|
| | HIGH-SPEED ROTATION | | MIDDLE-SPEED ROTATION | | LOW-SPEED ROTATION | |
| | HTe | HTd | MTe | MTd | LTe | LTd |
| Ta | | | | | | |
| Tb | | | | | | |
| Tc | | | | | | |
| Td | | | | | | |
| Te | | | | | | |
| Tf | | | | | | |

| OPERATING STATE | INPUT VOLTAGE (V) |
|---|---|
| STANDARD MODE | 20 |
| IDLE MODE | 12 |

| POWER CONSUMPTION | INPUT VOLTAGE (V) |
|---|---|
| LARGE | 20 |
| SMALL | 12 |

| POWER CONSUMPTION | FLUCTUATION AMOUNT | INPUT VOLTAGE (V) |
|---|---|---|
| LARGE | LARGE | 20 |
| LARGE | SMALL | 20 |
| SMALL | LARGE | 20 |
| SMALL | SMALL | 12 |

FIG. 8

| USAGE RATE | INPUT VOLTAGE (V) |
|---|---|
| HIGH | 20 |
| LOW | 12 |

FIG. 9

| USAGE RATE | FLUCTUATION AMOUNT | INPUT VOLTAGE (V) |
|---|---|---|
| HIGH | LARGE | 20 |
| HIGH | SMALL | 20 |
| LOW | LARGE | 20 |
| LOW | SMALL | 12 |

FIG. 10

| TEMPERATURE | INPUT VOLTAGE (V) |
|---|---|
| HIGH | 12 |
| LOW | 20 |

FIG. 11

| INPUT VOLTAGE (V) | | 20 | 12 | 5 |
|---|---|---|---|---|
| TEMPERATURE SENSOR | 51a | a20 | a12 | a5 |
| | 51b | b20 | b12 | b5 |
| | 51c | c20 | c12 | c5 |
| | 51d | d20 | d12 | d5 |
| | 51e | e20 | e12 | e5 |
| | 51f | f20 | f12 | f5 |

FIG. 12

| MOBILITY | INPUT VOLTAGE (V) |
|---|---|
| STATIONARY | 20 |
| LOW | 12 |
| HIGH | 5 |

FIG. 13

CONTROLLING POWER EFFICIENCY OF AN INFORMATION PROCESSING DEVICE

CROSS-REFERENCE TO RELATED APPLICATIONS

This is a continuation-in-part application of and claims priority to U.S. patent application Ser. No. 16/400,428 entitled "CONTROLLING POWER EFFICIENCY OF AN INFORMATION PROCESSING DEVICE" and filed on May 1, 2019 for Hideshi Tsukamoto et al, which is incorporated herein by reference.

FIELD

The subject matter disclosed herein relates to information processing devices and more particularly relates to controlling power efficiency of an information processing device.

BACKGROUND

An information processing device, such as a laptop personal computer ("PC"), may include components, such as a processor, that use direct current ("DC") power. Some information processing devices include a DC-DC converter that is, in one embodiment, used to stabilize an input voltage to achieve stable operation of the information processing device. Various information processing devices also include a battery that is charged with DC power from the DC-DC converter where the input DC power to the DC-DC converter is supplied by an external power supply that converts AC power to DC power. When DC power is not supplied to the information processing device, power stored in the battery is consumed. One laptop PC calculates a remaining battery time and displays the calculated remaining battery time on a liquid crystal display panel and communicates the remaining battery time to a user when a power consumption fluctuation event occurs.

SUMMARY

An apparatus for controlling power efficiency of an information processing device is disclosed. A method and system also perform the functions of the apparatus. An apparatus is disclosed that includes a voltage converter that converts an input voltage into a predetermined output voltage, an information processing device that consumes power supplied by the voltage converter, a battery pack that is charged using power supplied at a predetermined charging voltage by the voltage converter, and a controller that determines the input voltage, where the power supplied by the voltage converter exceeds power consumed by the information processing device and a difference between the input voltage and the predetermined charging voltage is minimized.

In some embodiments, the controller determines the input voltage such that the input voltage exceeds the predetermined charging voltage and the predetermined charging voltage is minimized.

In certain embodiments, the apparatus include an input/output ("I/O") interface configured to enable power to be supplied to the information processing device from an external source and to transmit voltage control data from a control unit of the information processing device to the external source. The controller, in one embodiment, determines a lower input voltage in response to determining that the information processing device is in a low-power operating mode. In certain embodiments, the controller determines a higher input voltage in response to the information processing device executing a scheduled task than in response to the information processing device not executing the scheduled task.

In some embodiments, the controller determines the input voltage based on a processor usage rate for the information processing device. In various embodiments, the apparatus includes a temperature sensor that detects a temperature of the information processing device, and the controller determines the input voltage based on the temperature. In certain embodiments, the apparatus includes an acceleration sensor that detects an acceleration of the information processing device, and the controller determines mobility of the information processing device based on the acceleration and further determines the input voltage based on the mobility.

A method for controlling power efficiency of an information processing device is disclosed. In one embodiment, the method converts an input voltage into a predetermined output voltage, supplies power to an information processing device at the predetermined output voltage, charges a battery pack using power supplied at a predetermined charging voltage, and determines the input voltage, where the supplied power exceeds power consumed by the information processing device and a difference between the input voltage and the predetermined charging voltage is minimized.

In one embodiment, the method further determines the input voltage such that the input voltage exceeds the predetermined charging voltage and the predetermined charging voltage is minimized. In some embodiments, the method further controls power supplied to the information processing device by an external source and transmits voltage control data from a control unit of the information processing device to the external source. In various embodiments, the method determines a lower input voltage in response to determining that the information processing device is in a low-power operating mode. In some embodiments, the method determines a higher input voltage in response to the information processing device executing a scheduled task than in response to the information processing device not executing the scheduled task.

In one embodiment, of a method determines the input voltage based on a processor usage rate for the information processing device. In certain embodiments, the method determines the input voltage based on a temperature of the information processing device. In various embodiments, the method determines the input voltage based on mobility of the information processing device.

A system for controlling power efficiency of an information processing device is also disclosed. In one embodiment, the system includes an information processing device including a voltage converter that converts an input voltage into a predetermined output voltage, wherein the information processing device consumes power supplied by the voltage converter, a battery pack that is charged using power supplied at a predetermined charging voltage by the voltage converter, and a controller that determines the input voltage, where the power supplied by the voltage converter exceeds power consumed by the information processing device and a difference between the input voltage and the predetermined charging voltage is minimized. The system further includes a power adapter external to the information procession device that supplies power to the voltage converter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a diagram illustrating a third embodiment of a voltage control table with a power consumption parameter and a power fluctuation parameter;

FIG. 9 is a diagram illustrating a fourth embodiment of a voltage control table with a usage rate parameter;

FIG. 10 is a diagram illustrating a fifth embodiment of a voltage control table with a usage rate field and a usage fluctuation parameter;

FIG. 11 is a diagram illustrating a sixth embodiment of a voltage control table with a temperature parameter;

FIG. 12 is a diagram illustrating a seventh embodiment of a voltage control table with temperature parameters for multiple temperature sensors;

FIG. 13 is a diagram illustrating an eighth example of the voltage control table with a mobility parameter.

DETAILED DESCRIPTION

Figure 1:
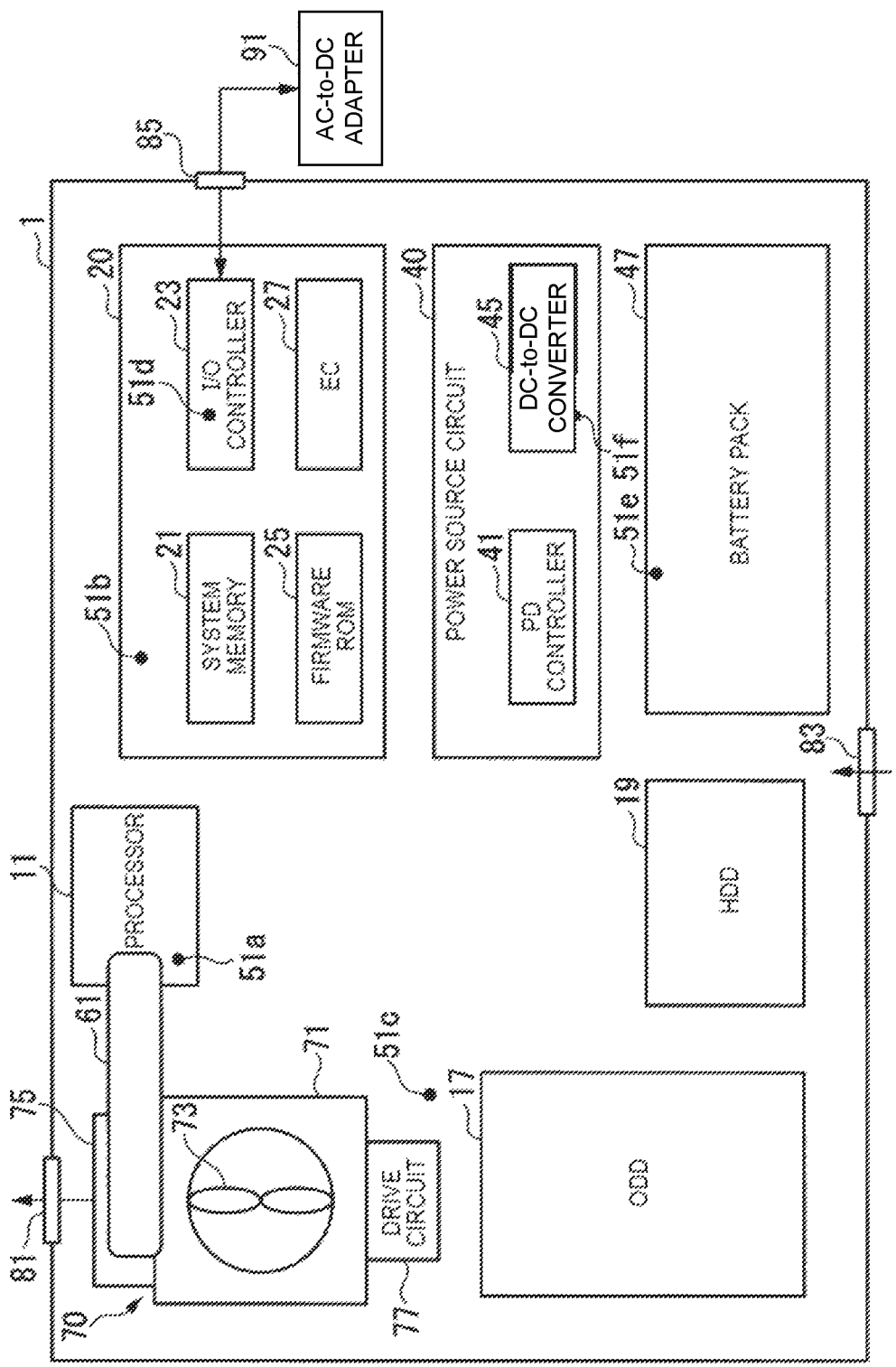
FIG. 1 is a schematic block diagram illustrating a layout of one embodiment of a system for controlling power efficiency of an information processing device.

FIG. 1 is a schematic block diagram illustrating a layout of one embodiment of a system for controlling power efficiency of an information processing device. In certain embodiments, the information processing device 1 is a Laptop PC by way of example. In other embodiments, the information processing device 1 includes, in one embodiment, a tablet, a terminal device, a smartphone, and the like. Moreover, in some embodiments, although the information processing device 1 is described as including certain features such as for example, a heat radiation fan 73 (e.g., a cooling fan), the described features such as the heat radiation fan 73 is, in one embodiment, omitted. Similarly, other features such as an Optical Disk Drive ("ODD") 17 or a Hard Disk Drive ("HDD") 19 is, in one embodiment, included in some embodiments and omitted in other embodiments of the information processing device 1.

In one embodiment, the information processing device 1 is includes a heat radiation unit 70 (e.g., a cooling unit), a processor 11, the ODD 17, the HDD 19, a circuit board 20, a power source circuit 40, a battery pack 47 and the like, which is, in one embodiment, individually disposed in an enclosure.

In various embodiments, the information processing device 1 further includes a system memory 21, an Input/Output ("I/O") controller 23, a firmware Read Only Memory ("ROM") 25, an Embedded Controller ("EC") 27 and so forth, which are disposed on the circuit board 20.

In some embodiments the system memory 21 is a computer readable nonvolatile storage medium which is utilized as an area into which an execution program of the processor 11 is to be read or a work area into which processed data of the execution program is to be written. In certain embodiments, the system memory 21 includes, for example, a plurality of Dynamic Random Access Memory ("DRAM") chips. In one embodiment, the execution program includes an Operating System ("OS"), various drivers adapted to operate peripherals, an application program adapted to execute specific processing, and so forth.

In one embodiment, the I/O controller 23 controls input and output operations performed between/among various functional units that make up the information processing device 1 and between the information processing device 1 and external equipment. The I/O controller 23 in some embodiments includes one or more I/O interfaces such as Serial Advanced Technology Attachment ("SATA"), Universal Serial Bus (USB), Peripheral Component Interconnect ("PCI") Express, Low Pin Count ("LPC") and so forth. In various embodiments, the I/O controller 23 includes a Real Time Clock ("RTC"). The I/O controller 23, in certain embodiments, includes a USB interface which conforms to, for example, the USB 3.2 standard (also called USB Type-C).

In certain embodiments, the USB interface is configured to connect with external equipment such as for example, an AC-to-DC adapter 91 via the USB interface and to receive power supplied from the external equipment when it is connected. In other words, in such embodiments the USB interface performs data input/output relative to the external equipment via a signal line which configures the USB and is also able to accept power supplied from the external equipment via a power line of the USB. For example, power supplied from the external equipment to the information processing device 1 and transmission of voltage control data from the EC 27 to the external equipment are facilitated using the USB interface.

In one embodiment, system firmware such as an I/O module, an authentication module and so forth are stored in advance in the firmware ROM 25. For example, a Basic Input/Output System (BIOS) is included in the I/O module. The BIOS is read into the EC 27 when power supply to the EC 27 is started. The EC 27 executes commands stored in various portions of the system firmware.

In various embodiments, hardware such as the EC 27 executes processing instructions or commands described in a program or firmware. For example, in certain embodiments the EC 27 controls input/output operations of a system device by executing processing instructions stored in the BIOS.

In one embodiment, EC 27 is a microcomputer that includes a Central Processing Unit ("CPU") a ROM, a RAM (Random Access Memory) and so forth, that are separate from a different CPU, RAM, ROM, etc., of the processor 11.

In various embodiments, EC 27 controls an operation of the power source circuit 40 based on an operating state of a main system 100 and controls power supply to various devices of the information processing device 1. In one embodiment, the EC 27 controls a input voltage of power that is supplied from the AC-to-DC adapter 91 to a Direct Current ("DC")-to-DC converter 45 of the power source circuit 40 based on the operating state of the main system 100. As used herein, the term "system device" means a device which configures the main system 100 and devices included in the EC 27 and/or a power control system 300 are not included in the system device.

In one embodiment, the power source circuit 40 includes a Power Delivery ("PD") controller 41, and the DC-to-DC converter 45. In the embodiment, the PD controller 41 controls the input voltage of the power which is supplied to the DC-to-DC converter 45 in accordance with control by the EC 27.

The DC-to-DC converter 45 is a voltage converter which converts the input voltage(s) of DC power which is supplied from either the AC-to-DC adapter 91 or the battery pack 47 or both the AC-to-DC adapter 91 and the battery pack 47 in accordance with control by the EC 27 and supplies power of a constant voltage which is obtained by voltage conversion to each device of the information processing apparatus 1.

Figures 3, 4:
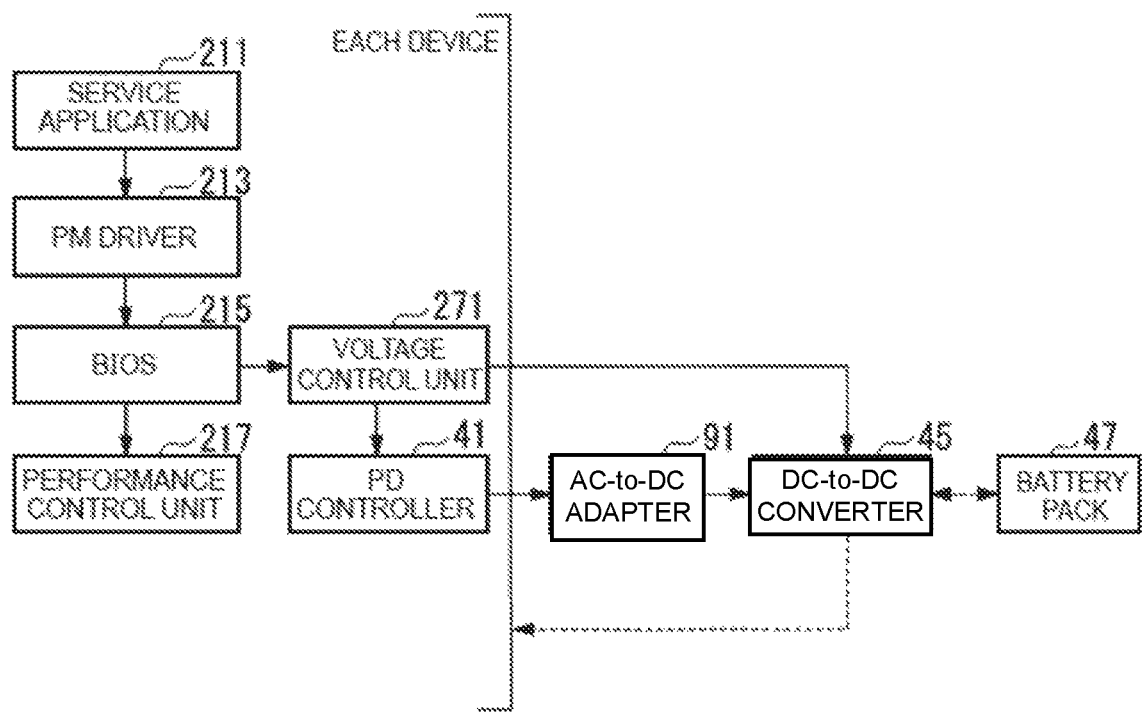
FIG. 3 is a schematic block diagram illustrating one embodiment of a Thermal Action Table ("TAT") for a system for controlling power efficiency of an information processing device.
FIG. 4 is a schematic block diagram illustrating one embodiment of a data flow in a voltage controller for a system for controlling power efficiency of an information processing device.

In addition, the DC-to-DC converter 45 controls charging of the power which is supplied from the AC-to-DC adapter 91 into the battery pack 47 in accordance with the control by the EC 27. The DC-to-DC converter 45 charges power which is left over without being consumed in the power which is supplied thereto into the battery pack 47 at a predetermined charging voltage. In various embodiments, when the AC-to-DC adapter 91 is not connected to the information processing apparatus 1 or when the power is not supplied from the AC-to-DC adapter 91, the DC-to-DC converter 45 converts the voltage of the power which is supplied from the battery pack 47 to a constant voltage and supplies the power of the constant voltage to each device of the information processing apparatus 1 (FIG. 4). In some embodiments, one or more operating parameters of the DC-to-DC converter 45 are fed back to each device (e.g., to the voltage control unit 271 and/or the PD controller 41) for use in controlling the DC-to-DC converter 45.

In various embodiments, the battery pack 47 is charged by power supplied from the DC-to-DC converter 45. In some embodiments, the battery pack 47 includes, for example, a lithium ion battery. In certain embodiments, the battery pack 47 may be also configured by laminating a plurality of batteries (cells) in series. The predetermined charging voltage which pertains to power charging into the battery pack 47 is set to a voltage which is made constant, in general, depending on material quality of electrodes of the batteries and the number of laminated batteries and is made slightly higher than a nominal voltage which is an index of a voltage to be discharged. When the AC-to-DC adapter 91 is not connected to the information processing apparatus 1 or where the power is not supplied from the AC-to-DC adapter 91 to the battery pack 47 via the DC-to-DC converter 45, the battery pack 47 discharges and supplies the power to the DC-to-DC converter 45. The battery pack 47 may be either fixedly mounted on or detachably attached to the information processing apparatus 1.

The AC-to-DC adapter 91 is electrically connected to an outlet of a commercial power source at one end thereof, is electrically connected to the information processing device 1 via a connector 85 at the other end thereof and is connected to allow input and output of respective pieces of data.

In various embodiments, the AC-to-DC adapter 91 converts AC power from the commercial power source (e.g., an electrical outlet) into DC power. The AC-to-DC adapter 91 supplies the DC power so converted to the DC-to-DC converter 45 via the connector 85.

Although in one embodiment as depicted in FIG. 1, the AC-to-DC adapter 91 is separate from the information processing device 1, in some embodiments, the AC-to-DC adapter 91 is integrated with the information processing device 1 e.g., incorporated within the chassis of the information processing device 1.

In one embodiment, the information processing device 1 includes a heat radiation unit 70 (e.g., a cooling unit) with a heat radiation fan 73 (e.g., a cooling fan), a heatsink 75, and a drive circuit 77. In certain embodiments, the heat radiation fan 73 is housed in a thin-type fan chamber 71. In various embodiments, the heat radiation fan 73 is a centrifugal type heat radiation fan which is equipped with a rotational shaft, a fan motor which rotates the rotational shaft, and a plurality of blades. And some embodiments, individual blades of the plurality of blades are attached to the rotational shaft. In one embodiment, the heatsink 75 exhausts heat which is conducted by indoor air-to-outdoor air heat exchange into the outdoor air.

In certain embodiments, the heatsink 75 is disposed at a position where the heatsink 75 is in contact with an opening in a side face of the fan chamber 71 and an exhaust port 81 in the chassis. When the heat radiation fan 73 rotates, the outdoor air flows into an intake port in the fan chamber 71 through a suction port 83, absorbs heat which is radiated from a plurality of fins when passing through between/among the plurality of fins formed on the heatsink 75, and is discharged to the outside air through the exhaust port 81.

In one embodiment, a heat pipe 61 is disposed in contact with the heatsink 75 and the processor 11 so as to be thermally coupled to heat receiving plates of the heatsink 75 and to the processor 11. In certain embodiments, one or more temperature sensors are included in the information processing device 1. In such embodiments, the one or more temperature sensors detect temperatures at one or more points of the information processing device 1 and output temperature data which indicates the detected temperatures to the EC 27. In some embodiments, the one or more temperature sensors are disposed on the various devices including chassis temperature management devices. As illustrated in FIG. 1, in one embodiment the information processing device 1 includes six temperature sensors 51a to 51f. The first temperature sensor 51a detects a temperature of the processor 11, the second temperature sensor 51b detects a temperature of the vicinity of the system memory 21 of the circuit board 20, the third temperature sensor 51c detects a temperature of the vicinity of the drive circuit 77, the fourth temperature sensor 51d detects a temperature of the I/O controller 23, the fifth temperature sensor 51e detects a temperature of the battery pack 47 and the sixth temperature sensor 51f detects a temperature of the DC-to-DC converter 45.

In various embodiments, the processor 11 includes a CPU. In some embodiments, the processor 11 further includes a Graphic Processing Unit ("GPU") in addition to the CPU. The CPU and the GPU are, in one embodiment, integrally formed as one core and/or a load is, in one embodiment, split between the CPU and the GPU which are formed as individual cores. In various embodiments, the information processing device includes one or more processors 11.

In some embodiments, although constant-voltage power is supplied from the DC-to-DC converter 45 to the processor 11, power consumption is variable. Similarly, in certain embodiments, an operating voltage and/or an operating frequency of the processor 11 vary based on the power consumption. For example, in certain embodiments the system firmware sets a maximum operating frequency for a particular operating state (e.g., an operating mode) of the main system 100 in a register of the processor 11. If the operating frequency that a particular point in time is higher than the set maximum operating frequency, the processor 11 stepwise changes the operating frequency to be within the set maximum operating frequency. When decreasing the operating frequency, in various embodiments, the processor 11 decreased the operating voltage down to a value which is necessary for the operation of the processor 11 at the decreased operating frequency (e.g., as implemented in the Intel SpeedStep® technologies) consequently, the power consumption and a heating value of the processor 11 are decreased.

In certain embodiments, a mean processing speed of the processor 11 is made variable by performing an intermittent operation by repeating operation and stopping of the operation in a constant cycle (throttling). In such embodiments, the system firmware sets throttling information and a duty ratio (a throttling rate) which indicate validity of the throttling in the register of the processor 11. In some embodiments, throttling includes a stepwise change to a processing capability and the heating value of the processor 11. This change in the processing capability brings a change in power consumption.

In one embodiment, the processor 11 uses the SpeedStep® together with the throttling and performs the throttling while maintaining a minimum operating frequency which is attained by the SpeedStep®. The processor 11, in one embodiment, utilizes the SpeedStep® and the throttling in order to change the processing capability of the processor 11 in multiple steps. As used herein, the processing capability of the processor 11 or the step of the processing capability vary by execution of either or both of the SpeedStep® and the throttling is referred to as a "performance step". A state is which the performance step is 100% indicates a predetermined normal state where the processing capability is not decreased.

In various embodiments, the processor 11 is equipped with a Thermal Control Circuit ("TCC"). For example, in an embodiment in which a temperature of the processor 11 is monitored and the temperature of the processor 11 increases more than a predetermined temperature due to an increase in load, the TCC controls the operation of the processor 11 to suppress an increase in temperature by decreasing the operating frequency and the operating voltage and performing the intermittent operation.

In the processor 11, in some embodiments, the higher the performance step is and the higher the usage rate is, the larger the power consumption becomes and therefore the heating value is increased. When the processing capability is to be decreased, the processor 11 sets a predetermined power consumption corresponding to the set performance step as the allowable maximum power consumption and operates so that the power consumption stays within the set maximum power consumption. Accordingly, the more the performance step is decreased, the more a process execution time is extended. Furthermore, heat that the processor 11 generates increases the temperature of the processor 11 and also increases a temperature in the chassis.

Figure 2:
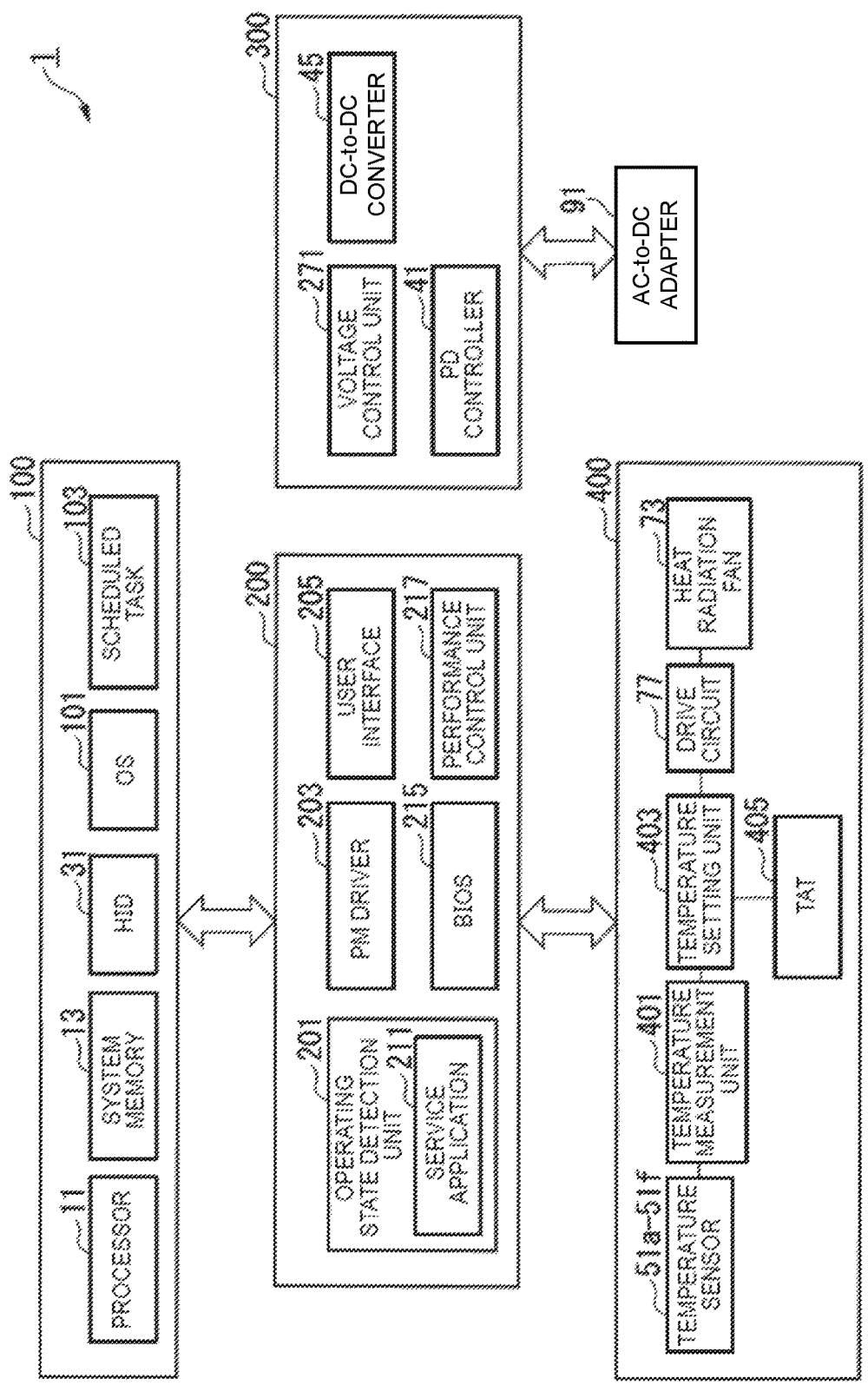
FIG. 2 is a schematic block diagram illustrating a logical view of one embodiment of a system for controlling power efficiency of an information processing device.

FIG. 2 is a schematic block diagram illustrating a logical view of one embodiment of systems 100, 200, 300, and 400 for controlling power efficiency of an information processing device. In one embodiment, the information processing device 1 is equipped with the main system 100, a performance control system 200, the power control system 300, a temperature control system 400.

In various embodiments, the main system 100 is a computer system that includes hardware such as the processor 11, the system memory 21, a Human Interface Device ("HID") 31 and so forth and software such as an OS 101, a scheduled task 103 and the like. The hardware such as the processor 11, system memory 21, the HID 31 executes the software e.g., the OS 101, the scheduled task 103 and so forth and thereby the processor 11 performs functions based on instructions of the software.

The HID 31, in certain embodiments, includes input devices with which a user physically interacts to input data such as a keyboard, a mouse, a touch screen and so forth and output devices which present information to the user such as a display, a loudspeaker and so forth.

The scheduled task 103 is a program which is executed when a predetermined condition (e.g., a trigger condition) is detected. The scheduled task 103 is registered in advance in a task scheduling function of the OS 101. One of the trigger conditions is for example, when the operating state (e.g., the operating mode) of the processor 11 is determined to be an idle mode. Such a situation would occur that when the operating mode is transitioned from a predetermined standard state (e.g., standard mode) to the idle mode. In some embodiments, the scheduled task 103 is immediately started and in other embodiments, the scheduled task 103 is not immediately started depending on the condition which is set as the trigger condition.

For example, in one embodiment, when the operating mode is the standard mode, if the CPU usage ratio is low and there is no data input into and/or output from the storage media such as the HDD 19, and there is no data input through the input device in a predetermined ratio (for example, 90%) in a past predetermined monitoring period (for example, 15 minute) which is counted up to that time point, the OS 101 determines that the operating mode is the idle mode. When an input through the input device is detected in the idle mode, the OS 101 determines that idle mode is ended and changes the operating mode to the standard mode and stops execution of the scheduled task 103. In various embodiments, a default trigger condition is set in advance and rather than the OS 101 executing the scheduled task 103 at a user's intended timing.

In one embodiment, the scheduled task 103 includes processing which pertains to maintenance and management of operations of the information processing device 1 such as, for example, execution of an operation of a computer anti-virus program, a functional diagnosis, execution of functions of the OS, downloading, construction, etc. In various embodiments, interaction with the user is not necessarily needed for execution of such function and the scheduled task 103 is executed without being noticed by the user.

In various embodiments, the performance control system 200 is performed by the processor 11 and includes an operating state detection unit 201, a user interface 205, a Power Management ("PM") driver 203, a BIOS 215, a performance control unit 217. The operating state detection unit 201 in certain embodiments, functions cooperatively with a service application 211 that the processor 11 executes on the OS 101 with middleware which is incorporated into a kernel of the OS 101 and acquires the operating state of the processor 11. The middleware monitors an idle process which is generated when the operating mode of the OS 101 is the idle mode. Since the idle process is dispatched in priority order which is higher than those of other processes, the idle process is executed earlier than the scheduled task 103 when the operating state of the OS 101 enters the idle mode. In addition, the middleware is able to hook (e.g., intervene in) the idle mode.

In one embodiment, the service application 211 is a state monitoring program that the processor 11 executes to monitor the operating state of the OS 101 and provides some functions of the operating state detection unit 201. The service application 211 is able to detect transition of the operating state of the main system 100 to the idle mode with reference to the idle process that the middleware hooks. The idle mode that the service application 211 detects matches the idle mode that the OS 101 recognizes. In various embodiments, the service application 211 acquires information on a usage rate of the processor 11 from the OS 101.

In certain embodiments, the service application 211 further acquires parameters such as a mean usage rate of the processor 11, presence/absence of a user activity, a disk access time, and the like, in a predetermined monitoring time and uniquely determines the operating state based on the acquired parameters. For example, after final detection of the user activity, in an embodiment in which the usage rate of the processor 11 is 0% after a predetermined time, the service application 211 determines that the operating mode is the idle mode. In some embodiments, the operating state detection unit 201 avoids execution of the scheduled task 103 by recognizing the uniquely defined idle mode and decreasing the processing capability of the processor 11 before the operating mode is transitioned to the idle mode and the scheduled task 103 is executed in the OS 101 which is the owner of the trigger condition.

In various embodiments, a process of a general task is higher in priority order than the process of the scheduled task 103. Therefore, in embodiments where the general task is executed in the idle mode, the right to use the processor 11 is taken away from the idle process. The service application 211 recognizes and end of the idle mode or a start of execution of the general task in the idle mode by monitoring this state. In some embodiments, the service application 211 recognizes the start of execution of the general task and the end of execution of the scheduled task 103 based on parameter such as the usage rate, the power consumption and so forth of the processor 11. The service application 211 outputs operating state information which indicates the detected operating state to the PM driver 203.

In one embodiment, the user interface 205 provides a screen that the user uses in order to set the operating state information. The user interface 205 accepts an operation which is input from the user and acquires the operating state information which is instructed by the accepted operation so input. The acquirable operating state information is, in one embodiment, any of parameters which influence the power consumption such as, for example, the operating mode, the maximum power consumption, the maximum usage rate and so forth. The user interface 205 outputs the set operating state information to the performance control unit 217.

In certain embodiments, the PM driver 203 extracts a parameter or parameters of the operating state which influence(s) the power consumption from various parameters which configure the operating state information which is input from the service application 211. The PM driver 203 outputs the operating state information which includes the extracted parameter(s) to the BIOS 215. The BIOS 215 is executed by the EC 27. The BIOS 215 outputs the operating state information which is input from the PM driver 203 to the voltage control unit 271 which configures the power control system 300 and the performance control unit 217 which configures the performance control system 200.

The performance control unit 217, in various embodiments, controls the processing capability of the processor 11 based on the operating state information which is input via the BIOS 215 or the operating state information that the user interface 205 sets. In certain embodiments, the performance control unit 217 is included as part of, for example, the system firmware. A control table which indicates performance steps for respective operating modes is set in advance in the performance control unit 217 thereby to determine one performance step which corresponds to one operating mode which is acquired with reference to the control table and then to set the determined performance step in the register of the processor 11.

In one embodiment, the performance control unit 217 also controls the processing capability of the processor 11 by further using a temperature of the processor 11 which is input from a temperature measurement unit 401. For example, a control table which indicates performance steps for respective sets of the temperature and the power consumption is set in advance in the performance control unit 217 thereby to determine one performance step which corresponds to one set of the temperature which is input and the power consumption that the acquired operating state information indicates with reference to the control table. The performance control unit 217 sets the determined performance step in the register of the processor 11.

FIG. 3 is a schematic block diagram illustrating one embodiment of a Thermal Action Table ("TAT") for a system for controlling power efficiency of an information processing device. The power control system 300 includes, in one embodiment, a voltage control unit 271, the PD controller 41, the DC-to-DC converter 45 and so forth. The EC 27 executes a predetermined control program and thereby realizes a function as the voltage control unit 271.

The voltage control unit 271 determines a input voltage to be applied to the DC-to-DC converter 45 based on the operating state information which is input from the BIOS 215. For example, a voltage control table which indicates the input voltages for the respective operating states is set in advance in the voltage control unit 271 thereby to determine one input voltage which corresponds to one operating state with reference to the voltage control table. The voltage control unit 271 outputs voltage control data which indicates the determined input voltage to the PD controller 41.

In addition, the voltage control unit 271 detects a charged state of the battery pack (FIG. 1) and controls charging of the battery pack 47 with the power from the DC-to-DC converter 45 based on the detected charged state. For example, in an example where electromotive force (a battery voltage) of the battery pack 47 becomes not less than a predetermined full-charge voltage, the voltage control unit 271 outputs charge control data which indicates to the DC-to-DC converter 45 to stop charging the battery pack 47. In an example where the electromotive force of the battery pack 47 becomes less than the predetermined full-charge voltage, the voltage control unit 271 outputs charge control data which indicates execution of charging to the DC-to-DC converter 45 in order to make the DC-to-DC converter 45 execute charging of the battery pack 47. The voltage control unit 271, in some embodiments, set in advance charge control data which includes a set value of a maximum charging current and a set value of a maximum charging voltage into the DC/DC voltage converter 45 and makes the DC/DC voltage converter 45 charge the battery pack 47 with power whose current is not more than the maximum charging current and whose voltage is not more than the maximum charging voltage which are indicated by the above-described set values.

The PD controller 41 controls the input voltage of the power which is supplied to the DC-to-DC converter 45 based on voltage control data which is output from the voltage control unit 271. Here, the PD controller 41 inputs the voltage control data which is output from the voltage control unit 271 into the AC-to-DC adapter 91 via the EC 27. Transmission of the voltage control data from the EC 27 to the AC-to-DC adapter 91 is performed via an I/O interface that the I/O controller 23 includes. The I/O interface makes power supply further from the AC-to-DC adapter 91 to the information processing device 1 possible.

The AC-to-DC adapter 91 converts AC power into DC power. The AC-to-DC adapter 91 sets the voltage of the DC power to the input voltage which is instructed in the voltage control data which is input from the PD controller 41. The information processing device 1 and the AC-to-DC adapter 91 are connected together via a USB cable which conforms to, for example, the USB 3.2 standard. The USB cable has a signal line and a power line. The AC-to-DC adapter 91 selects, for example, a voltage of one step from voltages of a plurality of steps which are set in advance as the voltages of the DC power and supplies the DC power which has the selected voltage as the input voltage to the information processing device 1.

Maximum power whose supply is possible for each voltage of each step is, in one embodiment, set in the AC-to-DC adapter 91. The AC-to-DC adapter 91 specifies the maximum power which is made in correspondence with the selected voltage. The AC-to-DC adapter 91 provides the DC power which is in a range of the specified maximum voltage to the information processing device 1.

The DC-to-DC converter 45 converts the input voltage of the power which is supplied from the AC-to-DC adapter 91 into a predetermined voltage which is necessary for the operation of each device which configures the information processing device 1 and supplies the power which has the converted voltage to each device. In certain embodiments, in an example where the power is not supplied from the AC-to-DC adapter 91, the DC-to-DC converter 45 converts the input voltage of the power which is supplied from the battery pack 47 into the predetermined voltage and supplies the power of the predetermined voltage to each device as illustrated for example in FIG. 4.

In addition, the DC-to-DC converter 45 controls charging of the power which is supplied from the AC-to-DC adapter 91 into the battery pack 47 based on charge control data which is input from the voltage control unit 271. The DC-to-DC converter 45 charges the power which is left over without being consumed by each device which is a supply destination of the voltage-converted power in the power which is supplied from the AC-to-DC adapter 91 into the battery pack 47 as depicted for example in FIG. 1.

When charge control data that indicates execution of power charging is input from the voltage control unit 271, the DC-to-DC converter 45 uses the power which is supplied from the AC-to-DC adapter 91 to charge the battery pack 47. When charge control data which indicates stop of power charging is input from the voltage control unit 271, the DC-to-DC converter 45 stops using the power which is supplied from the AC-to-DC adapter 91 to charge the battery pack 47.

The temperature control system 400 includes, in one embodiment, the temperature sensors 51a to 51f, the temperature measurement unit 401, a temperature setting unit 403, a Thermal Action Table ("TAT") 405, the drive circuit 77, the heat radiation fan 73 and so forth. The temperature measurement unit 401, the temperature setting unit 403 and the TAT 405 is, in one embodiment, either realized as some functions of the EC 27 or realized as some functions of the processor 11.

The temperature sensors 51a to 51f output temperature data which indicates temperatures that the temperature sensors 51a to 51f detect respectively to the temperature measurement unit 401.

The temperature measurement unit 401 acquires temperatures that pieces of temperature data which is input from the temperature sensors 51a to 51f indicate as temperatures Ta to Tf every predetermined time (for example, one second to one minute). The temperature measurement unit 401 outputs pieces of temperature data which indicates the acquired temperatures Ta to Tf to the temperature setting unit 403.

The temperature setting unit 403 determines operating states which correspond to the temperatures Ta to Tf with reference to the TAT 405. In some embodiments, the temperature control system sets the operating states of at least two or more steps as the operating states of the heat radiation fan 73. For example, in an example where the number of steps of the operating states is four, "Stop", "Low-Speed Rotation", "Middle-Speed Rotation" and "High-Speed Rotation" are set. As illustrated in FIG. 3, the TAT 405 is a data table which indicates enable temperatures HTe, MTe and Lte and disable temperatures HTd, MTd and LTd of the respective temperature sensors 51a to 51f for the respective operating states of the heat radiation fan 73.

As used herein, the term "enable temperature" refers to a temperature at which the step is shifted from a step which is lower in rotation speed to a step concerned when the temperature which is measured is on an increasing trend. The term "disable temperature" similarly refers to a temperature at which the step is shifted to a step which is lower in rotation speed than the step concerned when the temperature which is measured is on a decreasing trend. In general, the disable temperature is higher than the enable temperature of one temperature sensor and in one operating state. That is, the enable temperature and the disable temperature have hysteresis properties in an example where the rotation speed is increased and in an example where the rotation speed is decreased. However, the enable temperature and the disable temperature which correspond to "Stop" are not set in the TAT 405. In addition, "Stop" corresponds to a step which is lower than "Low-Speed Rotation" in rotation speed.

In embodiments in which a temperature which is measured by any one of the temperature sensors 51a to 51f becomes not less than the enable temperature which corresponds to one operating state, the temperature setting unit 403 determines the operating state which corresponds to that enable temperature as the operating state of the heat radiation fan 73. In embodiments in which where temperatures which are measured by all the temperature sensors 51a to 51f become less than one disable temperature which corresponds to one operating state, the temperature setting unit 403 determines the operating state where the rotation speed is lower than the rotation speed of the operating state at that time point by one step as the operating state of the heat radiation fan 73. The temperature setting unit 403 outputs a drive control signal which indicates the determined operating state to the drive circuit 77.

The drive circuit 77 supplies the power which corresponds to the operating state that the drive control signal which is input from the temperature setting unit 403 indicates to the heat radiation fan 73. Thereby, the rotation speed of the heat radiation fan 73 is controlled based on the temperatures Ta to Tf. The heating value of the main system 100 depends on a heating value of an electronic device, in particular, the heating value of the processor 11. For this reason, in embodiments in which processing which induces a high usage rate, for example, the scheduled task 103 is executed, there are examples where the rotation speed of the heat radiation fan 73 is increased.

FIG. 4 is a schematic block diagram illustrating one embodiment of a data flow in a voltage controller for a system for controlling power efficiency of an information processing device. The service application 211 detects the operating state of the processor 11 and outputs operating state information which indicates the detected operating state to the PM driver 203.

The PM driver 203 extracts information which influences the power consumption from the operating state information which is input from the service application 211 and outputs the extracted information to the BIOS 215.

The BIOS 215 outputs the operating state information which is input from the PM driver 203 to the performance control unit 217 and the voltage control unit 271.

The performance control unit 217 controls the processing capability of the processor 11 based on the operating state information which is input from the BIOS 215.

The voltage control unit 271 determines the input voltage which corresponds to the operating state information which is input from the BIOS 215 with reference to a voltage control table which is set in advance. The voltage control unit 271 outputs voltage control data which indicates the determined input voltage to the PD controller 41. In addition, the EC 27 detects a charged state of the battery pack 47, generates the charge control data in accordance with the detected charged state and outputs the generated charge control data to the DC-to-DC converter 45.

The PD controller 41 outputs the voltage control data which is input from the voltage control unit 271 to the AC-to-DC adapter 91.

The AC-to-DC adapter 91 converts the AC power into the DC power which has the voltage that the voltage control data indicates and supplies the converted DC power to the DC-to-DC converter 45.

In various embodiments, the DC/DC converter 45 charges DC power which is supplied from the AC-to-DC adapter 91 into the battery pack 47 on the basis of the charge control data which is input from the voltage control unit 271.

In some embodiments, the PD controller 41 may detect the presence and/or absence of power supplied from the AC-to-DC adapter 91. When an absence of the power suppled is detected, the PD controller 41 may stop output of voltage control data to the AC-to-DC adapter 91 and may output power stop information which indicates stop of the power supply to the voltage control unit 271. When the power stop information is input from the PD controller 41, the voltage control unit 271 outputs discharge control information to the DC-to-DC converter 45. When the discharge control information is input from the voltage control unit 271, the DC-to-DC converter 45 converts the voltage of the power which is discharged from the battery pack 47 into a voltage which is predetermined for each device and supplies the power which has the converted voltage to each device.

[Operating-Mode-Based]

Figures 5, 6, 7:
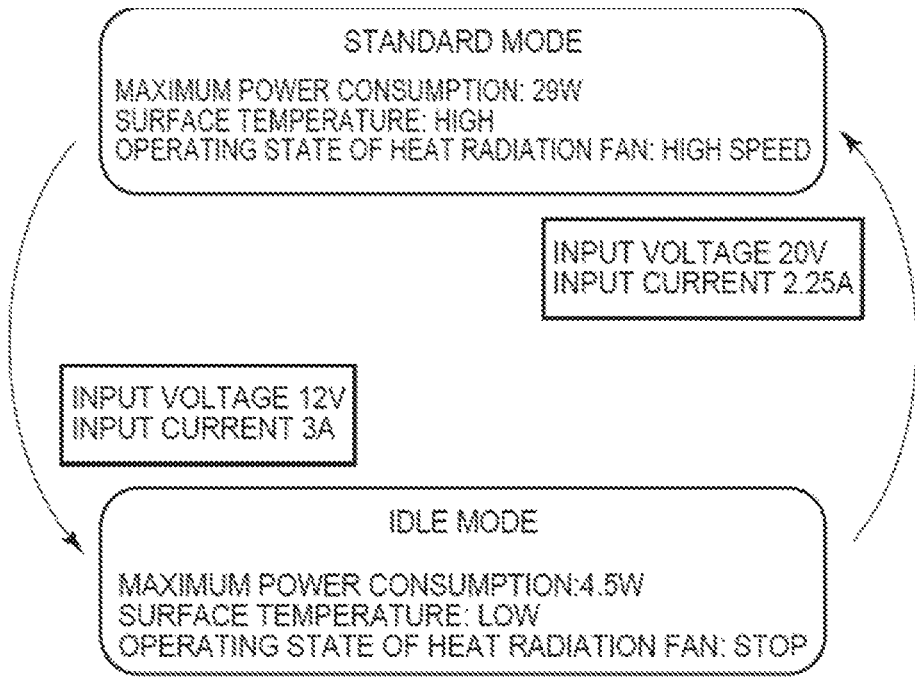
FIG. 5 is a state transition diagram illustrating one embodiment of transitions between operating modes of an information processing device.
FIG. 6 is a diagram illustrating a first embodiment of a voltage control table with an operating mode parameter.
FIG. 7 is a diagram illustrating a second embodiment of a voltage control table with a power consumption parameter.

FIG. 5 is a state transition diagram illustrating one embodiment of transitions between operating modes of an information processing device. In the example illustrated in FIG. 5, in embodiments in which the processor 11 takes either a standard mode (STD) or an idle (Idle) mode as the operating modes of two steps will be described. The standard mode is an operating mode in which a general task is processed with a predetermined standard processing capability. The idle mode is an operating mode in which the general task is processed with a processing capability which is sufficiently lower than the standard processing capability.

A loading amount which is allowed for the processor 11 in the idle mode is generally smaller than a loading amount which is allowed in the standard mode. In the example illustrated in FIG. 5, maximum power consumption, a surface temperature and the operating state of the heat radiation fan 73 in the standard mode are "29 W", "High" and "High Speed" respectively.

The maximum power consumption has a maximum value of the power consumption which is allowed for the main system 100. The surface temperature is the highest temperature which is allowed as the temperature Ta on the surface of the processor 11 which configures the main system 100. In the example illustrated in FIG. 5, the surface temperature takes any one of a plurality of steps which includes "High" and "Low" and each step is made in correspondence with each specific temperature. The maximum power consumption, the surface temperature and the operating state of the heat radiation fan 73 in the idle mode are "4.5 W", "Low" and "Stop" respectively.

As one example, a voltage control table which indicates the input voltages for the respective operating modes as the operating states is set in advance in the voltage control unit 271. The AC-to-DC adapter 91 is able to select any one of voltages of, for example, 20V, 12V and 5V as the input voltages of three steps and, for example, 2.25 A, 3 A and 3 A are set as maximum supply currents corresponding respectively to 20V, 12V and 5V. 20V and 12V are set as the input voltages for the standard mode and the idle mode respectively in accordance with the performance of the AC-to-DC adapter 91 in the voltage control table.

In some embodiments, the voltage control unit 271 may set the input voltage from the AC-to-DC adapter 91 such that a difference between the input voltage and the set voltage of the power which is charged into the battery pack 47 from the DC-to-DC converter 45 is reduced and maximum power which is allowed to be supplied from the AC-to-DC adapter 91 exceeds maximum power consumption in each mode of a computer system of the information processing apparatus 1 itself, that is, specifically, sufficiently exceeds maximum power consumption of the processor 11. This is because the smaller a difference between input power and set power for charging is, the more the efficiency of charging the power into the battery pack 47 is heightened, and consequently heat generation from the battery pack 47 is suppressed and the power which dissipates as heat is reduced. Power conversion efficiency is heightened by reducing a difference between the input voltage of the power which is supplied to the DC-to-DC converter 45 and the predetermined charging voltage of the power which is charged into the battery pack 47 in addition to the above-described input voltage setting.

In various embodiments, where using a DC-to-DC converter which is higher in conversion efficiency when the voltage is stepped up than when the voltage is stepped down, it may be preferable for the voltage control unit 271 to be configured such that the input voltage exceeds the set voltage of the power which is charged from the DC/DC converter 45 into the battery pack 47 and the difference between the input voltage and the predetermined charging voltage is reduced.

In FIG. 6, an example where the predetermined charging voltage of the power which is charged into the battery pack 47 is set to 8V is illustrated and in the voltage control table, 20V and 12V are respectively set for the standard mode and the idle mode as the input voltage. In general, since the lower the predetermined charging voltage of the power which is charged into the battery pack 47 becomes due to the smaller number of the laminated batteries of the battery pack 47, the more the efficiency of charging the power into the battery pack 47 is deteriorated when the input voltage from the AC-to-DC adapter 91 is high, an effect of controlling the input voltage is heightened.

In the examples illustrated in FIG. 5 and FIG. 6, the example where one of the operating modes of two steps such as the idle mode and the standard mode would take as the operating mode pertaining to control of the input voltage is described. However, three or more steps is, in one embodiment, set as the operating modes. One or both of a sleep mode and a hibernation mode is, in one embodiment, further included in the operating modes pertaining to the control of the input voltage. The sleep mode is an operating mode in which power supply to devices other than the system memory 21, the EC 27 and subordinate devices of the system memory 21 and the EC 27 is stopped and execution of a program which is running is stopped. Accordingly, the power consumption in the sleep mode becomes smaller than the power consumption in the idle mode.

For example, when a predetermined transition condition is satisfied, the service application 211 transitions the operating mode from the standard mode to the idle mode or the sleep mode. A condition of transition to the sleep mode is such a situation that, for example, a state where no input from the HID 31 is detected lasts for a predetermined time (for example, three to five minutes) or more. In some embodiments in which the information processing device 1 is a Laptop PC, the condition of transition to the sleep mode is such a situation that a state where the chassis is folded up is detected by a lid sensor (not illustrated). A condition of transition from the sleep mode to the standard mode is such a situation that, for example, the input from the HID 31 is detected.

The hibernation mode is a mode in which all pieces of information which are stored in the system memory 21 are evacuated to an auxiliary storage device which is immediately accessible from the processor 11 and thereafter also power supply to the system memory 21 is stopped in contrast to the sleep mode. The hibernation mode is also called a dormant state. Therefore, the power consumption in the hibernation mode becomes smaller than the power consumption in the sleep mode. A condition of transition from the standard mode, the idle mode or the sleep mode to the hibernation mode is such a situation that, for example, the electromotive force of the battery pack 47 is decreased and does not satisfy a predetermined electromotive force threshold value. A condition of transition from the hibernation mode to the standard mode is such a situation that, for example, the electromotive force of the battery pack 47 becomes not less than the predetermined electromotive force threshold value and the input from the HID 31 is detected.

In certain embodiments, in the control of the input voltage, system power consumption (Psys) is, in one embodiment, used as the operating state. The system power consumption is the power that the main system 100 consumes. Here, the service application 211 detects the system power consumption as the operating state of the main system 100. A voltage control table which indicates the input voltages for respective steps of the system power consumption is set in advance in the voltage control unit 271. In an example illustrated in FIG. 7, two steps, that is, "Large" and "Small" are set for the system power consumption. The input voltages which correspond to "Large" and "Small" are, for example, 20V and 12V respectively. "Large" and "Small" indicate, for example, a range of 34 W or more and a range of less than 34 W respectively.

FIG. 7 is a diagram illustrating a second embodiment of a voltage control table with a power consumption parameter. In the example in FIG. 7, in an embodiment in which the system power consumption that the operating state information indicates is increased and exceeds 34 W, the voltage control unit 271 sets the input voltage to 20V.

In one embodiment, in which the system power consumption that the operating state information indicates is decreased and falls below 34 W, the voltage control unit 271 sets the input voltage to 12V. Since the system power consumption is the power that the main system 100 actually consumes, it is possible to control the input voltage more finely than control which is based on the operating mode. For example, the scheduled task 103 is executed in the idle mode. However, in an example of simply relying on the operating mode-based control, there is the possibility that the power which is supplied from the AC-to-DC adapter 91 via the DC-to-DC converter 45 would become insufficient for the power consumption of the processor 11. Accordingly, it is possible to increase the power which is supplied to the information processing device 1 by setting the input voltage higher when the scheduled task 103 is executed than when the scheduled task 103 is not executed.

However, when the input voltage is low, the power which is supplied from the AC-to-DC adapter 91 is comparatively little. Thus, when the system power consumption is sharply increased, there is the possibility that the power which is supplied from the AC-to-DC adapter 91 would become insufficient. Therefore, the voltage control unit 271, in some embodiments, determines the input voltage by using the system power consumption and further a fluctuation amount of the system power consumption as the operating states of the main system 100.

In the above-mentioned example, the service application 211 calculates the system power consumption at each time point and further the fluctuation amount of the system power consumption. It is possible to utilize a parameter which indicates the magnitude of a fluctuation in system power consumption between a previous time point and a current time point as the fluctuation amount. The fluctuation amount is a value which is obtained by, for example, normalizing a difference obtained by subtracting the previous-time system power consumption from the current-time system power consumption with a fluctuation range in a predetermined time period (for example, ten seconds to one minute) up to the previous time point. The fluctuation range is, in one embodiment, a difference obtained by subtracting a minimum value from a maximum value of the system power consumption in the predetermined time period and is, in one embodiment, a deviation of the system power consumption in the predetermined time period. A voltage control table which indicates the input voltages for respective sets of the system power consumption and the fluctuation amount is set in the voltage control unit 271.

FIG. 8 is a diagram illustrating a third embodiment of a voltage control table with a power consumption parameter and a power fluctuation parameter. In an example illustrated in FIG. 8, two steps, that is, "Large" and "Small" are set for the system power consumption and two steps, that is, "Large" and "Small" are set for the fluctuation amount. The fluctuation amounts "Large" and "Small" indicate real numbers in a range of 1 or more and a range of less than 1 respectively. Also, a negative value is included in the range of less than 1, not limited to a positive value.

In the example illustrated in FIG. 8, in one embodiment in which the system power consumption that the operating state information indicates is "Large", the voltage control unit 271 sets the input voltage to 20V regardless of the magnitude of the fluctuation amount. In one embodiment in which the system power consumption is "Small" and the fluctuation amount is "Small", the voltage control unit 271 sets the input voltage to 12V. In one example in which although the system power consumption that the operating state information indicates is "Small", the fluctuation amount is "Large", the voltage control unit 271 sets the input voltage to 20V. Thereby, it is possible to avoid occurrence of a phenomenon that the power which is supplied becomes insufficient due to an increase in system power consumption.

In one embodiment, in the control of the input voltage, a usage rate of the processor 11 is included in the operating state. In various embodiments, the higher the usage rate is, the more the power consumption is increased. The usage rate is calculated by, for example, subtracting a ratio which is obtained by dividing the sum of an idle process user mode time and an idle process kernel mode time in a predetermined observation time (for example, one second) by the observation time from 1. Therefore, in the idle state, the usage rate approximates 0%.

In one embodiment, the service application 211 calculates the usage rate as the operating state of the main system 100. A voltage control table which indicates the input voltages for respective steps of the usage rate is set in advance in the voltage control unit 271. In an example illustrated in FIG. 9, two steps, that is, "High" and "Low" are set for the usage rate. The input voltages which correspond to "High" and "Low" are, for example, 20V and 12V respectively. "High" and "Low" indicate, for example, a range of 20% or more and a range of less than 20% respectively.

FIG. 9 is a diagram illustrating a fourth embodiment of a voltage control table with a usage rate parameter. In the example illustrated in FIG. 9, in one example in which the usage rate that the operating state information indicates is increased and exceeds 20%, the voltage control unit 271 sets the input voltage to 20V.

In one embodiment in which the usage rate that the operating state information indicates is decreased and falls below 20%, the voltage control unit 271 sets the input voltage to 12V.

The voltage control unit 271, in some embodiments, determines the input voltage by using the usage rate and further a fluctuation amount of the usage rate as the operating states of the main system 100.

In the above-mentioned example, the service application 211 further calculates the usage rate and further the fluctuation amount of the usage rate by using a method which is similar to the method for the system power consumption and the fluctuation amount thereof. A voltage control table which indicates the input voltages for respective sets of the usage rate and the fluctuation amount is set in the voltage control unit 271.

FIG. 10 is a diagram illustrating a fifth embodiment of a voltage control table with a usage rate field and a usage fluctuation parameter.

In an example illustrated in FIG. 10, two steps, that is, "High" and "Low" are set for the usage rate and two steps, that is, "Large" and "Small" are set for the fluctuation amount. The fluctuation amounts "Large" and "Small" indicate, for example, a real number of 1 or more and a real number of less than 1 respectively.

In the example illustrated in FIG. 10, in one embodiment in which the usage rate that the operating state information indicates is "High", the voltage control unit 271 sets the input voltage to 20V regardless of the magnitude of the fluctuation amount. In one example in which the usage rate is "Low" and the fluctuation amount is "Small", the voltage control unit 271 sets the input voltage to 12V. In an embodiment in which although the usage rate that the operating state information indicates is "Low", the fluctuation amount is "Large", the voltage control unit 271 sets the input voltage to 20V. Thereby, it is possible to avoid occurrence of the phenomenon that the power which is supplied becomes insufficient in an example in which the system power consumption is increased due to an increase in usage rate.

In certain embodiments, in the control of the input voltage, a temperature of the information processing device 1 is, in one embodiment, used as the operating state. Any one of the temperature Ta of the processor 11 which is one main heat source, the temperature Tf of the DC-to-DC converter 45 which is another main heat source and other temperatures is, in one embodiment, used as an observed temperature.

Thus, the service application 211 acquires temperature data from the temperature measurement unit 401 as the operating state of the main system 100 and includes the observed temperature that the acquired temperature data indicates into the operating state information. A voltage control table which indicates the input voltages for the respective observed temperatures is set in the voltage control unit 271. In an example illustrated in FIG. 11, two steps, that is, "High" and "Low" are set for the temperature. The input voltages which correspond to "High" and "Low" are, for example, 20V and 12V respectively. "High" and "Low" indicate, for example, a range of 30° C. or more and a range of less than 30° C. respectively.

FIG. 11 is a diagram illustrating a sixth embodiment of a voltage control table with a temperature parameter. In one example illustrated in FIG. 11, where the temperature that the operating state information indicates is increased and exceeds 30° C., the voltage control unit 271 sets the input voltage to 12V. In an example in which the temperature that the operating state information indicates is decreased and falls below 30° C., the voltage control unit 271 sets the input voltage to 20V.

In certain embodiments, in the control of the input voltage, temperatures of a plurality of places is, in one embodiment, used as the observed temperatures, not limited to the temperature of one place. For example, all the temperatures Ta to Tf that the temperature sensors 51a to 51f detect respectively is, in one embodiment, used. In the above-mentioned example, the service application 211 includes temperature data which indicates the temperatures Ta to Tf which are acquired from the temperature measurement unit 401 into the operating state information as the operating states of the main system 100. A voltage control table which indicates sets of the observed temperatures for the respective input voltages is set in advance in the voltage control unit 271.

FIG. 12 is a diagram illustrating a seventh embodiment of a voltage control table with temperature parameters for multiple temperature sensors. In an example illustrated in FIG. 12, three steps, that is, for example, 20V, 12V and 5V are set for the input voltage. Allowable temperature ranges a20, a12, . . . , and f5 of the observed temperatures for the respective temperature sensors in the respective steps are described in the voltage control table. In general, the higher the input voltage is, the more the temperature range is narrowed. That is, in regard to the same temperature sensor, one temperature range which corresponds to one input voltage is included in one temperature range which corresponds to a lower input voltage.

In the example illustrated in FIG. 12, the voltage control unit 271 decides to which temperature range the temperature of each one of the temperature sensors 51a to 51f that the operating state information indicates belongs with reference to the voltage control table and specifies the highest input voltage in the input voltages which correspond to the temperature range to which the temperature of each one of the temperature sensors 51a to 51f belongs. The specified input voltage becomes the input voltage which corresponds to the temperature which is detected by each temperature sensor. Then, the voltage control unit 271 sets the lowest input voltage in the input voltages which are specified for the respective temperature sensors 51a to 51f as the input voltage of the power which is supplied from the AC-to-DC adapter 91.

In certain embodiments, the performance control unit 217 determines the performance step which is set in the processor 11 with reference to the temperatures which pertains to setting of the input voltage in such a manner that the system power consumption of the main system 100 becomes smaller than effective supplied power. Here, the effective supplied power is calculated by multiplying the product of the input voltage and the input current further by conversion efficiency of the DC-to-DC converter 45. Thereby, occurrence of the phenomenon that the power which is supplied becomes insufficient for the system power consumption is avoided.

In various embodiments, in the control of the input voltage, a parameter which indicates mobility of the information processing device 1 which is running is, in one embodiment, used as the operating state. As used herein, the term "mobility" means an indicator of whether the information processing device 1 moves, that is, a degree of movement. For example, the mobility of the information processing device 1 is low if resting on a desk which is in a stationary state. The mobility is higher in a state where the information processing device 1 is positioned on a user (for example, on the knee) who sits on a chair and still higher in a state where the information processing device 1 is carried by the user who is walking. In various embodiments, the lower the mobility is, the more complicated operations the user is likely to perform thereby consuming more power.

Accordingly, the voltage control unit 271, in some embodiments, determines the input voltage based on the mobility of the information processing device 1. The information processing device 1 is further equipped with an acceleration sensor (not illustrated). The acceleration sensor is, for example, a triaxial acceleration sensor. The triaxial acceleration sensor has three sensitive axes which are orthogonal to one another in a three-dimensional space and outputs acceleration data which indicates accelerations which are detected in respective sensitive axial directions (X, Y and Z directions) to the EC 27.

The EC 27 is equipped with an acceleration processing unit (not illustrated). The acceleration processing unit performs weighted time averaging on the accelerations in the respective sensitive axial directions that the acceleration data which is input from the acceleration sensor indicates and estimates a component of a gravitational acceleration. The acceleration processing unit subtracts the component of the estimated gravitational acceleration from the acceleration that the acceleration data indicates and extracts a movement-based component. The acceleration processing unit extracts a component of a frequency band (for example, 1 to 20 Hz) in which there is the possibility that movement of the information processing device 1 is brought about by a motion of a human being from the components which are extracted in the respective sensitive axial directions. The acceleration processing unit calculates an absolute value of the extracted component, that is, the square root of sum of squares of the components which are extracted in the respective sensitive axial directions. The acceleration processing unit calculates a time mean value of the calculated absolute values in a predetermined time period (for example, one to five seconds) which is counted up to the current time point as an index value which indicates the mobility. Then, the acceleration processing unit outputs the calculated index value to the service application 211.

The service application 211 acquires the mobility from the acceleration processing unit as the operating state of the information processing device 1 and includes the acquired mobility into the operating state information.

A voltage control table which indicates the input voltage for every mobility is set in the voltage control unit 271. In an example illustrated in FIG. 13, three steps, that is, "Stationary", 'low" and "High" are set for the mobility. The input voltages which correspond to "Stationary", "Low" and "High" are, for example, 20V, 12V and 5V respectively. That is, the higher the mobility is, the lower the input voltage becomes. For example, "Stationary", "Low" and "High" indicate, for example, a range of not less than 0 m/s2 and less than 0.01 m/s2, a range of not less than 0.01 m/s2 and less than 0.3 m/s2 and a range of not less than 0.3 m/s2 respectively.

FIG. 13 is a diagram illustrating an eighth example of the voltage control table with a mobility parameter. In the example illustrated in FIG. 13, in an example where the mobility that the operating state information indicates is not less than 0 m/s2 and less than 0.01 m/s2, the voltage control unit 271 sets the input voltage to 20V, in an example where the mobility that the operating state information indicates is not less than 0.01 m/s2 and less than 0.3 m/s2, the voltage control unit 271 sets the input voltage to 12V and in an example where the mobility that the operating state information indicates is not less than 0.3 m/s2, the voltage control unit 271 sets the input voltage to 5V.

In certain embodiments, the performance control unit 217, in some embodiments, determines the performance step which is set in the processor 11 with reference to the mobility which pertains to setting of the input voltage in such a manner that the system power consumption of the main system 100 becomes smaller than the effective power. Thereby, occurrence of a phenomenon that the power which is supplied becomes insufficient for the system power consumption is avoided.

As described above, the information processing device 1 according to the present embodiment is equipped with a voltage converter (for example, the DC-to-DC converter 45) which converts the input voltage of the power into the predetermined output voltage and a computer system (for example, the main system 100) which consumes the power which is supplied from the voltage converter. In addition, the information processing device 1 is equipped with a control unit (for example, the voltage control unit 271) which determines the input voltage in accordance with the operating state of the computer system.

In such an embodiment, the power which has the input voltage according to the operating state of the computer system is supplied to the voltage converter. In general, since the conversion efficiency of the voltage converter depends on the input voltage, it is possible to control efficiency of power supply to the computer system by making the input voltage variable. It is possible to improve the efficiency of the power supply by, for example, reducing the difference between the input voltage and the output voltage.

In certain embodiments, in the information processing device 1, the control unit sets the input voltage lower in the operating mode which is smaller in power consumption as the operating mode of the computer system. Accordingly, it is possible to improve charging efficiency without hindering the operation of the computer system by securing the power to be supplied in every operating mode and then reducing the difference between the input voltage and the output voltage.

In one embodiment, in the information processing device 1, where the operating mode of the computer system is the idle mode, the control unit sets the input voltage higher when the computer system executes the scheduled task than when the computer system does not execute the scheduled task. Accordingly, even in an example where the power consumption is increased due to execution of the scheduled task, it is possible to avoid a shortage of the power which is supplied to the computer system.

In various embodiments, in the information processing device 1, the control unit determines the input voltage based on the power consumption of the computer system. Therefore, the input voltage is set in such a manner that the power that the computer system consumes is secured.

The control unit, in one embodiment, determines the input voltage in such a manner that the power which is supplied from the voltage converter is larger than the power consumption of the computer system and the difference between the input voltage and the output voltage from the voltage converter is reduced.

Such embodiments improve the conversion efficiency of the voltage converter by reducing the difference between the input voltage and the output voltage without hindering the operation of the computer system. Since heat generation from the voltage converter is suppressed by improving the efficiency, it is possible to avoid or mitigate a reduction in battery (for example, the battery pack 47) charging efficiency in association with an increase in temperature.

In various embodiments, in the information processing device 1, the control unit determines the input voltage based on the usage rate of the processor that the computer system has. The power consumption of the processor 11 occupies most of the power consumption of the computer system of the information processing device 1 and there is a tendency that the larger the throughput of the processor is, the larger the power consumption becomes. Therefore, the input voltage is set in such a manner that the power which is necessary is secured in accordance with the usage rate of the processor 11.

In one embodiment, the information processing device 1 is equipped with the temperature sensors 51a to 51f which detect the temperatures of the information processing device 1 and the control unit controls the input voltage based on the detected temperatures. Owing to the above-mentioned configuration, the information processing device 1 is able to control the input voltage based on the detected temperatures. For example, when the temperature is increased, it is possible to decrease the power which is supplied to the computer system by decreasing the input voltage. Since the allowable power consumption is decreased, it is possible to stop or mitigate temperature increase caused by consumption of the power and the power which dissipates without being consumed. It is possible to prevent occurrence of an operation failure caused by the temperature increase eventually.

In some embodiments, the information processing device 1 is equipped with the acceleration sensor (not illustrated) which detects the acceleration of the information processing device 1, and the control unit decides the mobility of the information processing device 1 based on the detected acceleration and controls the input voltage based on the determined mobility. In general, the lower the mobility of the information processing device 1 is, the more the throughput of the processing which is instructed from the user is increased. Therefore, it is possible to control the input voltage based on the decided mobility. It is possible to decrease the power which is supplied to the computer system, for example, by decreasing the input voltage as the mobility is increased. Since the allowable power consumption is decreased, it is possible to stop or mitigate the temperature increase caused by consumption of the power and the power which dissipates without being consumed. It is possible to prevent occurrence of the operation failure caused by the temperature increase eventually.

In various embodiments, the structures, functions, and other features are practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a battery pack that stores first power including a first voltage;
    an information processing device that consumes second power including a second voltage that is less than the first voltage; and
    a voltage converter that:
        converts an input voltage into a predetermined first output voltage for charging the battery pack with the first power including the first voltage in response to receiving a charge control signal for charging the battery pack, and
        converts the first power including the first voltage stored in the battery pack into a predetermined second output voltage for powering the information processing device with the second power including the second voltage in response to receiving a discharge control signal for the battery pack; and
    a controller that determines the input voltage.

2. The apparatus of claim 1, wherein the input voltage exceeds the predetermined second output voltage.

3. The apparatus of claim 1, further comprising an input/output ("I/O") interface configured to:
    enable power to be supplied to the information processing device from an external source; and
    transmit voltage control data from a control unit of the information processing device to the external source.

4. The apparatus of claim 1, wherein the controller determines a lower input voltage in response to determining that the information processing device is in a low-power operating mode.

5. The apparatus of claim 3, wherein the controller determines a higher input voltage in response to the information processing device executing a scheduled task than in response to the information processing device not executing the scheduled task.

6. The apparatus of claim 1 wherein the controller determines the input voltage based on a processor usage rate for the information processing device.

7. The apparatus of claim 1, further comprising a temperature sensor that detects a temperature of the information processing device, wherein the controller determines the input voltage based on the temperature.

8. The apparatus of claim 1, further comprising an acceleration sensor that detects an acceleration of the information processing device, wherein the controller:
  determines mobility of the information processing device based on the acceleration; and
  determines the input voltage based on the mobility.

9. A method comprising:
  converting an input voltage into a predetermined first output voltage for charging a battery pack with first power including first voltage in response to receiving a charge control signal for charging the battery pack;
  converting the first power including the first voltage stored in the battery pack into a predetermined second output voltage for powering an information processing device with second power including a second voltage in response to receiving a discharge control signal for the battery pack;
  supplying the second power including the second voltage to the information processing device; and
  determining the input voltage.

10. The method of claim 9, wherein the input voltage exceeds the predetermined second output voltage.

11. The method of claim 9, further comprising:
  controlling power supplied to the information processing device by an external source; and
  transmitting voltage control data from a control unit of the information processing device to the external source.

12. The method of claim 9, further comprising determining a lower input voltage in response to determining that the information processing device is in a low-power operating mode.

13. The method of claim 12, further comprising determining a higher input voltage in response to the information processing device executing a scheduled task than in response to the information processing device not executing the scheduled task.

14. The method of claim 9, further comprising determining the input voltage based on a processor usage rate for the information processing device.

15. The method of claim 9, further comprising determining the input voltage based on a temperature of the information processing device.

16. The method of claim 9, further comprising determining the input voltage based on mobility of the information processing device.

17. A system comprising:
  an information processing device that consumes second power including a second voltage, comprising:
    a battery pack that stores first power including a first voltage;
    a voltage converter that:
      converts an input voltage into a predetermined first output voltage for charging the battery pack with the first power including the first voltage in response to receiving a charge control signal for charging the battery pack, and
      converts the first power including the first voltage stored in the battery pack into a predetermined second output voltage for powering the information processing device with the second power including the second voltage in response to receiving a discharge control signal for the battery pack,
      wherein the information processing device consumes the second power supplied by the voltage converter;
    a controller that determines the input voltage; and
  a power adapter external to the information procession device that supplies power to the voltage converter.

18. The system of claim 17, wherein the input voltage exceeds the predetermined second output voltage.

19. The system of claim 17, further comprising a temperature sensor that detects a temperature of the information processing device, wherein the controller determines the input voltage based on the temperature.

20. The apparatus of claim 17, further comprising an acceleration sensor that detects an acceleration of the information processing device, wherein the controller:
  determines mobility of the information processing device based on the acceleration; and
  determines the input voltage based on the mobility.

* * * * *